(12) United States Patent
Letson et al.

(10) Patent No.: US 11,776,366 B2
(45) Date of Patent: *Oct. 3, 2023

(54) SYSTEMS AND METHODS FOR PROJECTING ACTION INDICATORS

(71) Applicant: Walmart Apollo, LLC, Bentonville, AR (US)

(72) Inventors: Eric A. Letson, Bentonville, AR (US); Tom G. Douglass, Bentonville, AR (US); Jason D. Bellar, Bella Vista, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/101,752

(22) Filed: Jan. 26, 2023

(65) Prior Publication Data

US 2023/0196888 A1 Jun. 22, 2023

Related U.S. Application Data

(63) Continuation of application No. 17/122,595, filed on Dec. 15, 2020, now abandoned, which is a
(Continued)

(51) Int. Cl.
*B60K 35/00* (2006.01)
*G08B 5/36* (2006.01)
(Continued)

(52) U.S. Cl.
CPC ............. *G08B 5/22* (2013.01); *G06Q 10/087* (2013.01); *G06T 7/0004* (2013.01); *H04N 7/183* (2013.01); *G06V 40/10* (2022.01)

(58) Field of Classification Search
CPC .................................................. G06Q 10/087
See application file for complete search history.

(56) References Cited

U.S. PATENT DOCUMENTS 9,714,139 B1 7/2017 Aggarwal
9,858,547 B2 1/2018 Jones
(Continued)

FOREIGN PATENT DOCUMENTS

WO 2022197598 A1 9/2022

OTHER PUBLICATIONS

Molyneaux, David, et al.; "Cooperative Augmentation of Smart Objects with Projector-Camera Systems"; International Conference on Ubiquitous Computing; 2007; pp. 501-518.
(Continued)

*Primary Examiner* — Joseph H Feild
*Assistant Examiner* — Pameshanand Mahase
(74) *Attorney, Agent, or Firm* — Fitch, Even, Tabin & Flannery LLP

(57) ABSTRACT

In some embodiments, apparatuses and methods are provided herein useful to projecting action indicators on items in a retail facility. In some embodiments, a system comprises an image capture device configured to capture an image of a shelving unit, a control circuit configured to identify items located in the shelving unit, determine an action item for an item located in the shelving unit, identify boundaries of the item, and generate an action image including an action indicator based on the action item for the item, wherein the action indicator is located within the boundaries of the item, and a display device configured to present the action image on the shelving unit, wherein the action indicator is presented on the item.

20 Claims, 4 Drawing Sheets

Related U.S. Application Data continuation of application No. 16/842,188, filed on Apr. 7, 2020, now Pat. No. 10,896,584.

(60) Provisional application No. 62/840,862, filed on Apr. 30, 2019.

(51) Int. Cl.
| | |
|---|---|
| *G09F 21/04* | (2006.01) |
| *G08B 5/22* | (2006.01) |
| *H04N 7/18* | (2006.01) |
| *G06Q 10/087* | (2023.01) |
| *G06T 7/00* | (2017.01) |
| *G06V 40/10* | (2022.01) |

(56) References Cited

U.S. PATENT DOCUMENTS

| | | | |
|---|---|---|---|
| 10,846,859 B1 | 11/2020 | Stahl | |
| 10,896,584 B2 | 1/2021 | Letson | |
| 2011/0221771 A1 | 9/2011 | Cramer | |
| 2011/0258045 A1 | 10/2011 | Chickering | |
| 2013/0147839 A1* | 6/2013 | Fukushima | G06Q 30/06 345/633 |
| 2016/0247006 A1 | 8/2016 | Hansen | |
| 2017/0069143 A1 | 3/2017 | Salter | |
| 2017/0109115 A1 | 4/2017 | Fan | |
| 2017/0225891 A1 | 8/2017 | Elazary | |
| 2017/0286773 A1 | 10/2017 | Skaff | |
| 2018/0005446 A1 | 1/2018 | Elazary | |
| 2018/0047243 A1 | 2/2018 | Swafford, Jr. | |
| 2019/0149725 A1* | 5/2019 | Adato | H04N 1/00 348/158 |
| 2019/0244436 A1 | 8/2019 | Stansell | |
| 2019/0333008 A1 | 10/2019 | Wolfe | |
| 2019/0339923 A1* | 11/2019 | Nel | G06Q 10/087 |
| 2020/0005225 A1* | 1/2020 | Chaubard | H04N 23/57 |
| 2020/0118154 A1* | 4/2020 | Schumacher | G06Q 30/0223 |
| 2020/0349815 A1 | 11/2020 | Letson | |

OTHER PUBLICATIONS

Nayak, Sunita; "Augmented Reality using ArUco Markers in OpenCV (C++ / Python)"; https://www.learnopencv.com/augmented-reality-using-aruco-markers-in-opencv-c-python/; Mar. 21, 2020; pp. 1-8.

PCT; App. No. PCT/US2022/020164; International Search Report and Written Opinion dated Jun. 29, 2022; (19 pages).

Raskar, Ramesh, et al.; "RFIG Lamps: Interacting with a Self-Describing World via Photosensing Wireless Tags and Projectors"; ACM SIGGRAPH 2004; 2004; pp. 406-415.

U.S. Appl. No. 16/842,188; Notice of Allowance and Fee(s) Due dated Sep. 17, 2020; pp. 1-8.

U.S. Appl. No. 17/122,595; Notice of Allowance and Fees Due (PTOL-85) dated Nov. 7, 2022; (pp. 1-8).

* cited by examiner

SYSTEMS AND METHODS FOR PROJECTING ACTION INDICATORS

CROSS-REFERENCE TO RELATED APPLICATION

This application is a continuation of U.S. application Ser. No. 17/122,595, filed Dec. 15, 2020, which is a continuation of U.S. application Ser. No. 16/842,188, filed Apr. 7, 2020, which is now issued as U.S. Pat. No. 10,896,584, which claims the benefit of U.S. Provisional Application No. 62/840,862, filed Apr. 30, 2019, each of which is incorporated by reference in its entirety herein.

TECHNICAL FIELD

This invention relates generally to retail facilities and, more particularly, to indicating actions to perform with respect to items in a retail facility.

BACKGROUND

Maintaining stock of items in a retail facility is an important part of the customer experience. For example, if a customer can't find an item that he or she is looking for because the item is not on the shelf, the customer may become frustrated. In addition to customer frustration, if the item is located in the stockroom, the fact that the item was not properly stocked will result in a lost sale for the retail facility. Accordingly, improperly stocked items cause problems for both customers and retail facilities.

Many retail facilities task employees with ensuring that items are properly stocked. Typically, an employee will enter a stock room with a list of items that need to be stocked (i.e., moved from the stockroom to the salesfloor). While this can be an effective way to stock a store, it is prone to error and is time consuming. For example, an employee may forget to stock an item on the list, misread the list and stock the wrong item, etc. Additionally, unless an employee has the list of items, the employee will not know what items need to be stocked. Accordingly, a need exists for improved systems and methods for stocking retail facilities.

BRIEF DESCRIPTION OF THE DRAWINGS

Disclosed herein are embodiments of systems, apparatuses, and methods pertaining to projecting action indicators on items in a retail facility. This description includes drawings, wherein.

Figure 1:
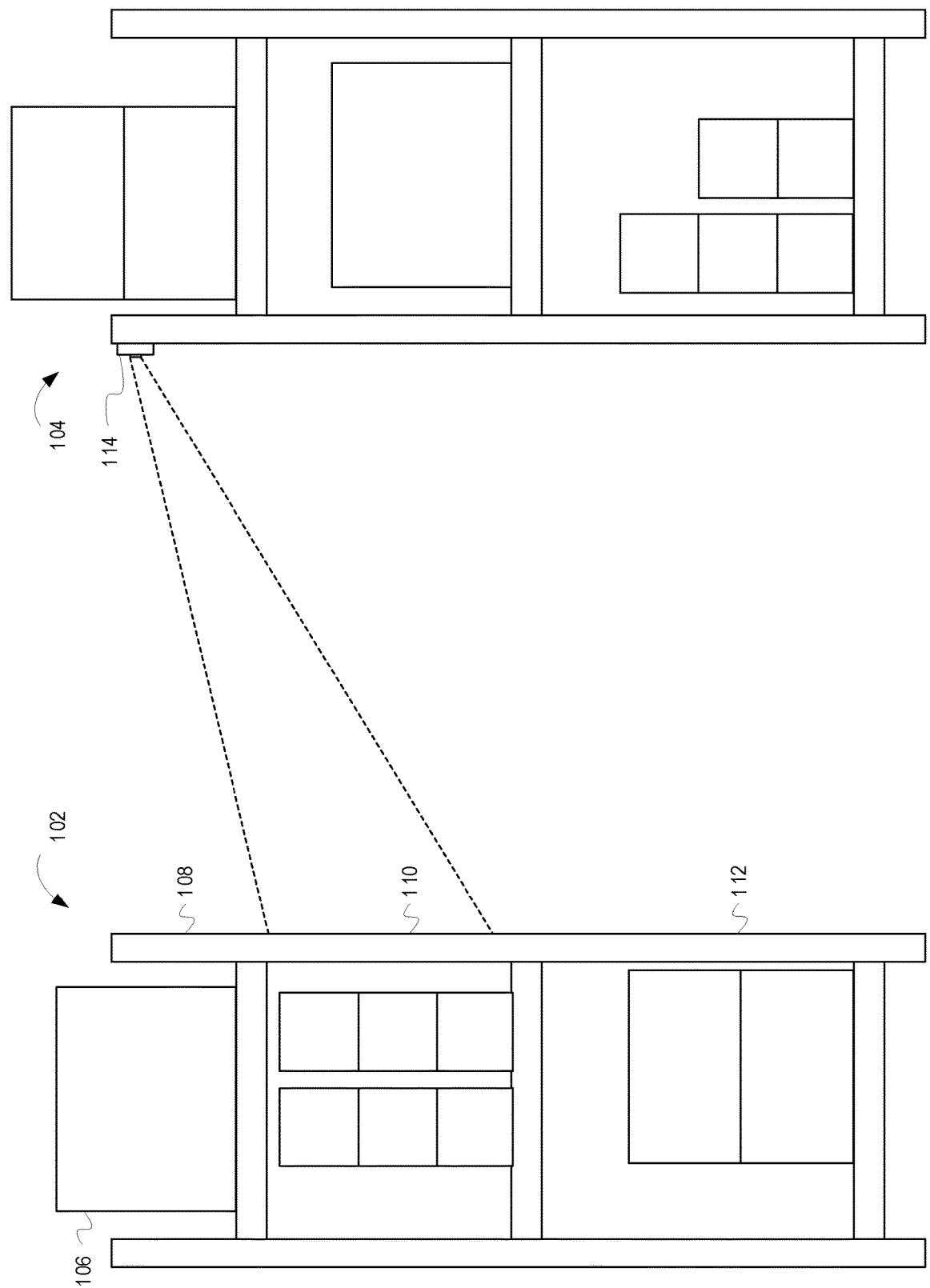
FIG. 1 is a side view of a display device 114 presenting an action image on items in a shelving unit 102, according to some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses, and methods are provided herein useful to projecting action indicators on items in a retail facility. In some embodiments, a system for projecting action indicators on items in a retail facility comprises an image capture device, wherein the image capture device is configured to capture an image of a shelving unit, a control circuit, wherein the control circuit is communicatively coupled to the image capture device, and wherein the control circuit is configured to identify, based on the image of the shelving unit, items located in the shelving unit, determine, based on an identity of at least one of the items located in the shelving unit, an action item for the at least one of the items located in the shelving unit, identify, based on the image of the shelving unit, boundaries of the at least one or the items located in the shelving unit, and generate, based on the image of the shelving unit and the action item for the at least one of the items located in the shelving unit, an action image, wherein the action image includes an action indicator based on the action item for the at least one of the items located in the shelving unit, wherein the action indicator is located within the boundaries of the at least one of the items located in the shelving unit, and a display device, wherein the display device is communicatively coupled to the control circuit, and wherein the display device is configured to present the action image on the shelving unit, wherein during presentation of the action image, the action indicator is presented on the at least one of the items located in the shelving unit.

As previously discussed, a properly stocked salesfloor is important to a retail facility. For example, a properly stocked salesfloor can result in an improved customer experience and increased sales for the retail facility. Currently, most retail facilities rely on employees taking note of what items need to be stocked before going to the stockroom to retrieve the items. Some retail facilities have attempted to improve this process by providing employees with handheld devices that report which items need to be stocked. However, these systems have downsides. For example, if the employee has not made note of what items need to be restocked and/or does not have a handheld device, the employee will not know what items to take from the stockroom to the salesfloor.

Described herein are systems, methods, and apparatuses that seek to improve this stocking process. In one embodiment, a system includes an image capture device (e.g., a camera) and a display device (e.g., a projector). The image capture device captures an image of a shelving unit in a stockroom. The system determines which items included on the shelving unit need to be stocked and generates an action image with action indicators. The action indictors indicate an action item for the item (e.g., the item needs to be stocked, recalled, etc.). The display device then presents the action image on top of the items in the shelving unit. With the action image presented on the items, it is easy for an employee to quickly determine what items need to be stocked without the need for a list or handheld device to inform the employee of what items need to be stocked. The discussion of FIG. 1 provides an overview of such a system.

FIG. 1 is a side view of a display device 114 presenting an action image on items in a shelving unit 102, according to some embodiments. The shelving unit 102 includes three bins (i.e., storage locations within the shelving unit 102): a first bin 108, second bin 110, and a third bin 112. The bins are used to store various items 106, such as products that the retail facility will offer for sale.

An image capture device captures images of the shelving unit 102. The image capture device can be positioned at any suitable location, such as on a second shelving unit 104 located across from the shelving unit 102, supported from a ceiling, etc. The image includes the items 106 located in the bins of the shelving unit 102. The image is used to identify the items 106 located on the shelving unit 102. The items 106 are identified (discussed in more detail with respect to FIG. 3) and action items (i.e., indications of an actions to perform) for the items 106 are determined for each of the items 106. An action image is generated based on the image captured by the image capture device. The action image includes outlines (i.e., based on the boundaries of the items 106) and includes action indicators for the items 106. The display device 114 presents the action image includes the action indicators on the shelving unit 102, as depicted in FIG. 2B.

Figure 2A:
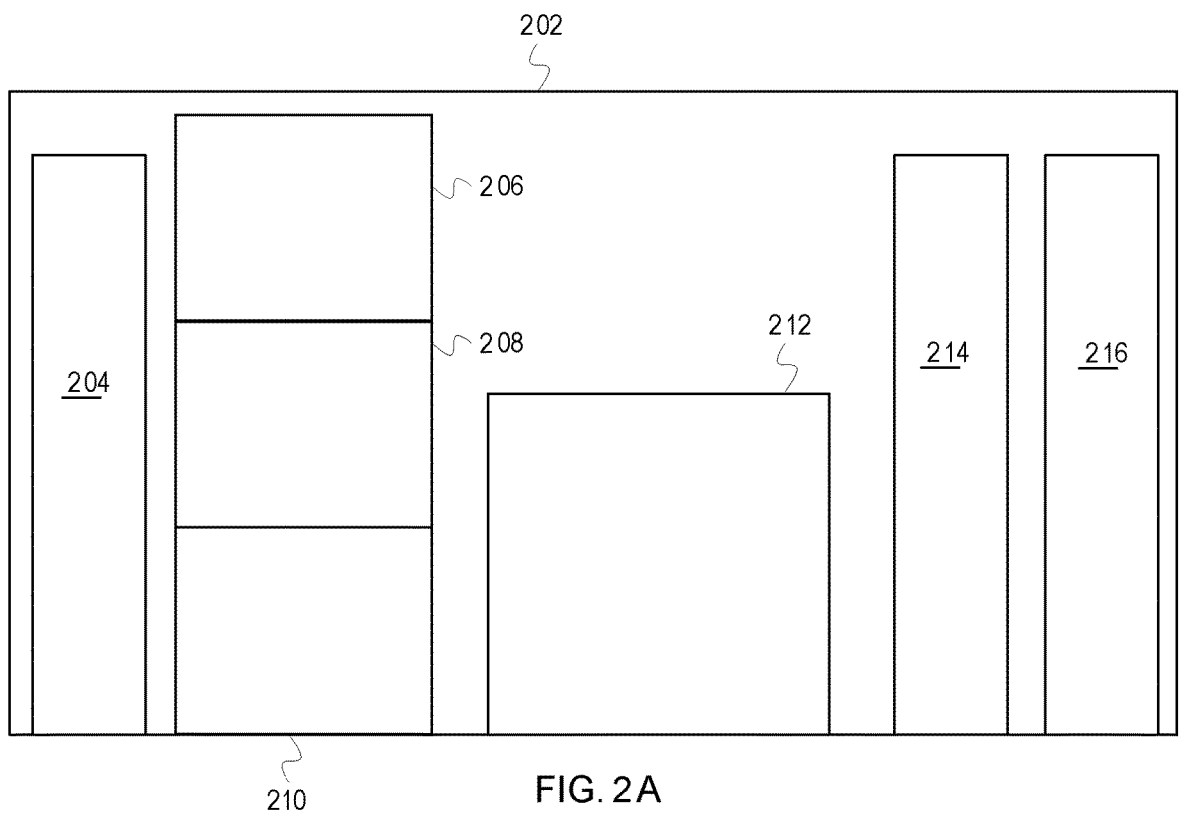
FIG. 2A depicts items in a shelving unit 202 before an action image is presented on the shelving unit 202, according to some embodiments.
Figure 2B:
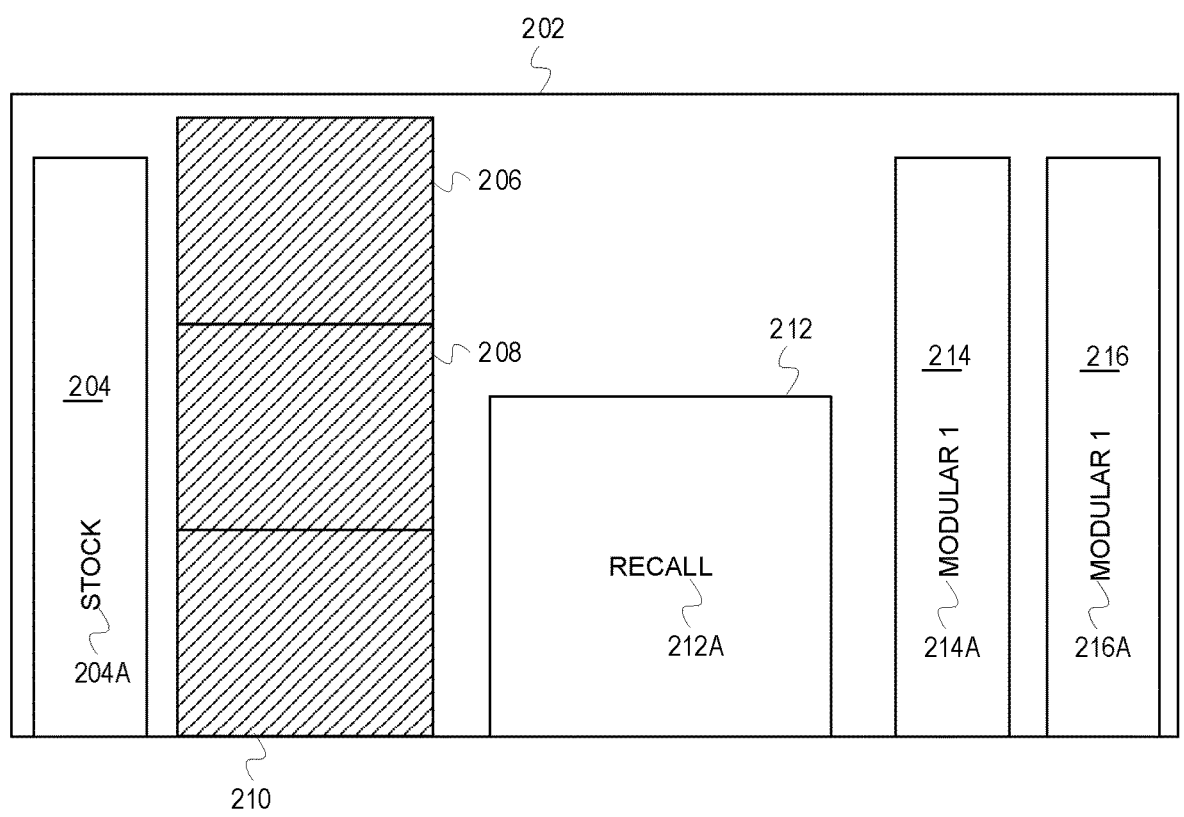
FIG. 2B depicts items in the shelving unit 202 during presentation of the action image on the shelving unit 202, according to some embodiments.

While the discussion of FIG. 1 provides a brief overview of a system for projecting action indicators on items, the discussion of FIGS. 2A and 2B provides additional detail regarding the action image.

FIG. 2A depicts items in a shelving unit 202 before an action image is presented on the shelving unit 202 and FIG. 2B depicts items in the shelving unit 202 during presentation of the action image on the shelving unit 202. As can been seen in FIGS. 2A and 2B, the shelving unit 202 includes seven items: a first item 204, a second item 206, a third item 208, a fourth item 210, a fifth item 212, a sixth item 214, and a seventh item 216. There are various actions that need to be performed with each item. Specifically, the first item 204 needs to be stocked, the fifth item 212 has been recalled, and the sixth item 214 and the seventh item 216 are part of a modular. A "do nothing" action is associated with the second item 206, the third item 208, and the fourth item 210. The "do nothing" action means that there isn't a specific action for the item currently.

Depicted in FIG. 2A is the shelving unit 202 as would normally be seen (i.e., without presentation of an action image). In accordance with some embodiments, an action image is generated that includes action indicators for the items on the shelving unit 202. FIG. 2B depicts the shelving unit 202 with the action image being presented on the shelving unit 202.

As previously discussed, each of the items on the shelving unit 202 has an action that needs to be performed. The action indicators indicate the actions that need to be performed. Specifically, as depicted in FIG. 2B, the first item 204 needs to be stocked and includes a first action indicator 204A indicating that the first item 204 needs to be stocked, the fifth item 212 is being recalled and includes a fifth action indicator 212A indicating that the fifth item 212 is being recalled, the sixth item 214 and seventh item 216 are part of a modular have and have a sixth action indicator 214A and a seventh action indicator 216A indicating that the sixth item 214 and the seventh item 216 are part of a modular. Because the second item 206, third item 208, and fourth item 210 have a "do nothing" action, these items do not include a specific action indicator. Instead, as depicted in FIG. 2B, they are greyed out.

While the discussion of FIG. 2B includes action indicators that are verbal (e.g., the word "stock"), embodiments are not so limited. That is, the action indicators can take any suitable form. For example, the action indicators can be symbolic (e.g., a checkmark for items that need to be stocked), numeric (e.g., numbers indicating a location within the retail facility in which the item is located), color-coded (i.e., different colors indicate different action), and so on. Additionally, the action indicators can include multiple characteristics (e.g., a color and a symbol). Additionally, though not depicted in FIG. 2B, items with "do nothing" actions can include action indicators (e.g., the phrase "do not stock," a red "X"), etc.) or include no action indicator at all.

The presentation of the action image can also vary from embodiment-to-embodiment. In its simplest form, the display device can constantly present the action image (e.g., during normal business hours or when employees are scheduled to work). However, in some embodiments, the action image can be presented periodically or based on a triggering event. For example, sensors (e.g., motion sensors, proximity sensors, auditory sensors, radio frequency identification (RFID) readers, etc.) can be used to detect when the action image should be presented. These sensors can use, for example, Bluetooth, Wi-Fi, audio, light, etc. to sense the presence of a person. As one example, when the presence of a person is detected, the display device can present the action image.

Additionally, in some embodiments, the presentation of the action image can be dependent upon an identity of the person in the area. For example, the action image may only be presented if an employee tasked with stocking is in the area. This distinction can be as granular as desired. For example, if an employee in the sporting good department is in the stockroom, only those action images including items in the sporting good department may be presented. Further, in some embodiments, only those action identifiers associated with items in the sporting goods department may be presented in the action image(s). The identification of persons can be achieved through the use of RFID tags and RFID readers, near field communication (NFC), etc. As one example, an employee can carry an RFID tag and RFID readers can detect the RFID tag. The RFID tag can identify the employee (e.g., a specific employee, a type of employee (e.g., an employee tasked with stocking products), etc.). When the RFID reader reads the RFID tag, the system can present the action image if the identification of the employee matches those employees for which the action image should be presented. Alternatively, or additionally, this can be accomplished by monitoring the location of employees. For example, an employee can carry a locationing device (e.g., based on GPS, triangulation with in-store signals (e.g., Wi-Fi, etc.). When an employee's location is proximate to the shelving unit 202, the action image can be presented.

Figure 3:
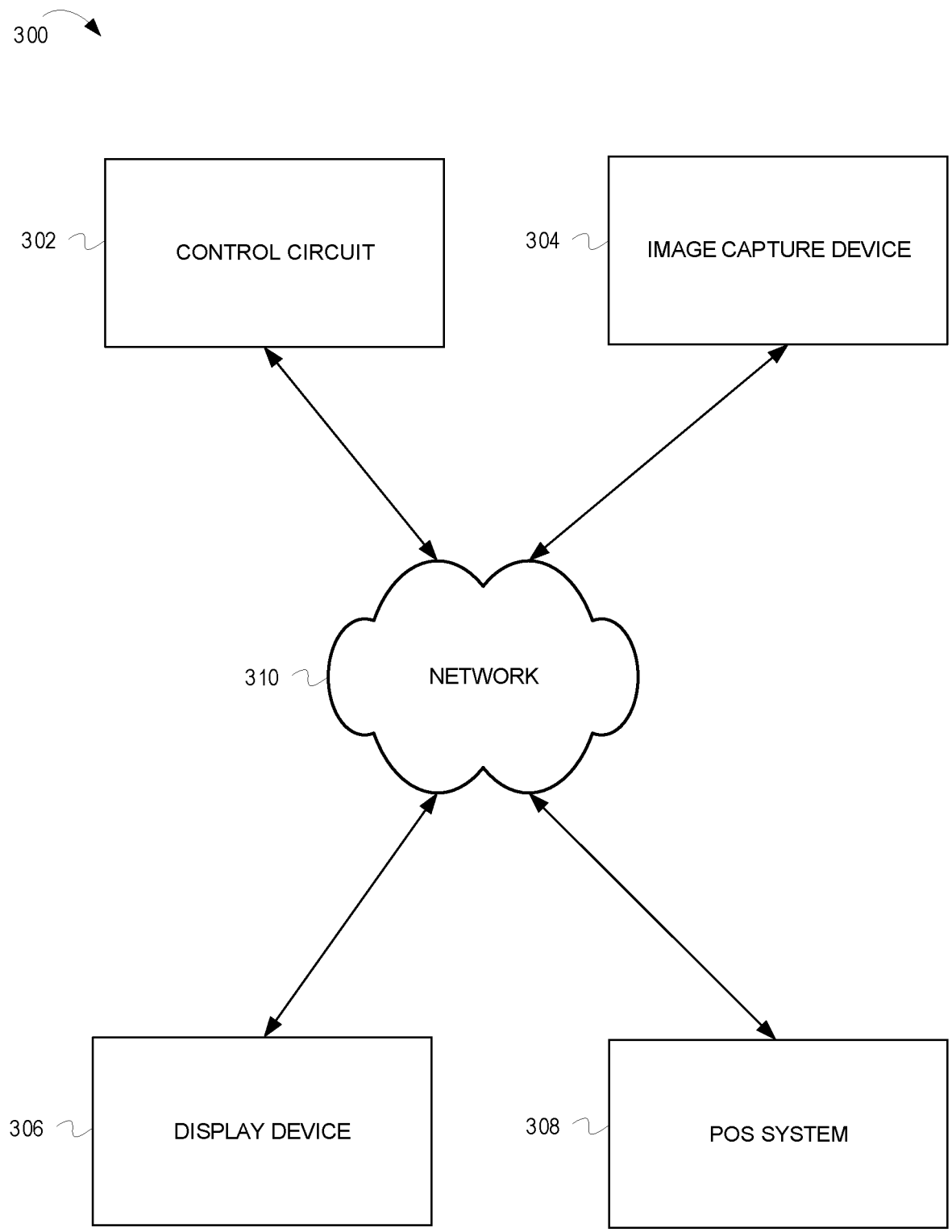
FIG. 3 is a block diagram of a system 300 for presenting action indicators on items in a retail facility, according to some embodiments.

While the discussion of FIGS. 2A and 2B provides additional detail regarding action images and action indicators, the discussion of FIG. 3 provides additional detail regarding a system for generating and presenting the action images.

FIG. 3 is a block diagram of a system 300 for presenting action indicators on items in a retail facility, according to some embodiments. The system 300 includes a control circuit 302, an image capture device 304, a display device 306, a point-of-sale (POS) system 308, and a network 310. At least some of the control circuit 302, image capture device 304, display device 306, and POS system 308 are communicatively coupled via the network 310. For example, each of the components may be communicatively coupled to one another via the network 310 or only some of the components may be communicatively coupled via the network 310. Additionally, though shown as distinct components, one or more of the control circuit 302, image capture device 304, display device 306, and POS system 308 may be part of a single component. The network 310 can be of any suitable type, such as a local area network (LAN), wide area network (WAN), or a combination of the two.

The image capture device 304 captures images of a shelving unit, including items that are on the shelving unit. The images can be still images or video images, dependent upon the embodiment. The image capture device 304 transmits the images to the control circuit 302.

The control circuit 302 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. The control circuit 302 is configured (for example, by using corresponding programming as will be well understood by those skilled in the art) to carry out one or more of the steps, actions, and/or functions described herein.

By one optional approach the control circuit 302 operably couples to a memory. The memory may be integral to the control circuit 302 or can be physically discrete (in whole or in part) from the control circuit 302 as desired. This memory can also be local with respect to the control circuit 302 (where, for example, both share a common circuit board, chassis, power supply, and/or housing) or can be partially or wholly remote with respect to the control circuit 302 (where, for example, the memory is physically located in another facility, metropolitan area, or even country as compared to the control circuit 302).

This memory can serve, for example, to non-transitorily store the computer instructions that, when executed by the control circuit 302, cause the control circuit 302 to behave as described herein. As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).

The control circuit 302 analyzes the image to identify the items in the image. The control circuit 302 can identify the items in the image based on marking included in the image, such as words, product identifiers, barcodes, etc. For example, the control circuit 302 can recognize text using optical character recognition (OCR) to determine the identity of the item based on markings on a box containing the item. For items that are not boxed, the control circuit 302 can identify the items based on image recognition against images, for example, stored in a database. In addition to identifying the items, the control circuit identifies the boundaries of the items. For a boxed item, the boundaries of the item are the edges of the box. For an unboxed item, the boundaries are the edges of the item.

The control circuit 302 uses POS data supplied by the POS system 308 to determine actions to perform for the items. The POS system 308 tracks sales data for items as well as inventory data. For example, if the POS data indicates that there are only a few remaining items of a certain type of the sales floor, the control circuit 302 determines that a stocking action is necessary for that item. Additionally, in some embodiments, this determination can be predictive based on past sales data. For example, if sales of an item are historically high during a certain day of the week or time of day, the control circuit 302 can predictively determine that a stocking action should be performed for that item. The control circuit 302 can determine any number of actions for items based not only on the POS data, but also on any other desired data source. For example, if a produce item is nearing its sell by date, the control circuit 302 can determine that a stocking action should be performed for that produce item or if an item has reached its sell by date or expiration date the control circuit 302 can determine that a expiration action should be performed for that item. As another example, if a recall is in effect for a certain item, the control circuit 302 can determine that a recall action is warranted for that item. The control circuit 302 uses this information to generate an action image. The action image is based on the image of the items and includes action indicators. The action indicators indicate the action to perform with the item. In one embodiment, the action indicators are included within the boundaries of the items in the action image, as depicted in FIG. 2B.

The display device presents the action image, including the action indicators, on the shelving unit. Accordingly, the display device can be of any suitable type, such as a projector. The display device can be positioned in any suitable location, such as mounted to a structure in a stockroom, such as a shelving unit or the ceiling.

Figure 4:
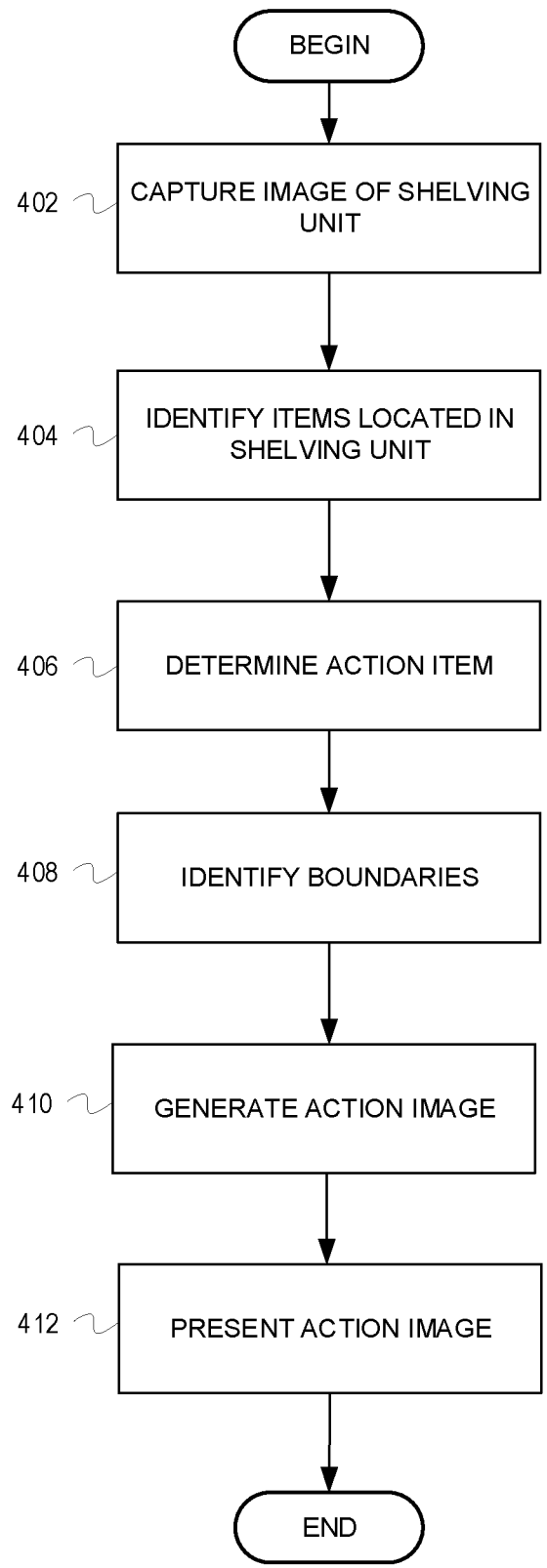
FIG. 4 is a flow diagram including example operations for presenting action indicators on items in a retail facility, according to some embodiments.

While the discussion of FIG. 3 provides additional detail regarding a system for presenting (i.e., projecting) action indicators on items, the discussion of FIG. 4 describes example operations for presenting action indicators on items.

FIG. 4 is a flow diagram including example operations for presenting action indicators on items in a retail facility, according to some embodiments. The flow begins at block 402.

At block 402, an image is captured of a shelving unit. For example, an image capture device can capture the image of the shelving unit. The shelving unit holds items, and thus the image of the shelving unit includes those items. The flow continues at block 404.

At block 404, items located on the shelving unit are identified. For example, a control circuit can identify the items on the shelving unit. The control circuit identifies the items on the shelving unit based on the image of the shelving unit. The control circuit can identify the items based on OCR, image recognition, etc. For example, the control circuit, using OCR, can read product labels and/or identifiers in the image of the shelving unit. The control circuit can then reference a database to identify the items based on the read product labels and/or identifiers. The flow continues at block 406.

At block 406, an action item is determined. For example, the control circuit can determine the action item. The action item is an action that needs to be performed with the item. For example, the item may need to be stocked, recalled, moved for a modular, or have nothing done with it. The control circuit can determine the action item for the items based on the identity of the item, POS data, and/or any other relevant information. The flow continues at block 408.

At block 408, boundaries of the items in the image of the shelving unit are identified. For example, the control circuit can identify the boundaries of the items in the image. The boundaries of the items are the edges of the items. The control circuit can identify the boundaries of the items based on any suitable technique. For example, the control circuit can identify the boundaries of the items based on colors in the image of the shelving unit, light patterns in the image of the shelving unit, or any other suitable photo analysis technique. In some embodiments, the control circuit identifies the boundaries of the items by analyzing pixels in the image of the shelving unit. The flow continues at block 410.

At block 410, an action image is generated. For example, the control circuit can generate the action image. The action image is based on the image of the shelving unit. The action image includes the action indicators. In one embodiment, the action indicators are located within the boundaries of their respective items. The flow continues at block 412.

At block 412, the action image is presented. For example, a display device can present the action image. The action image is presented on the shelving unit. In one embodiment, the action image is presented such that the boundaries of the items in the action image align with the boundaries of the items on the shelving unit. In such embodiments, the action indicators are presented on the items in the shelving unit.

In some embodiments, a system for projecting action indicators on items in a retail facility comprises an image capture device, wherein the image capture device is configured to capture an image of a shelving unit, a control circuit, wherein the control circuit is communicatively coupled to the image capture device, and wherein the control circuit is configured to identify, based on the image of the shelving unit, items located in the shelving unit, determine, based on an identity of at least one of the items located in the shelving unit, an action item for the at least one of the items located in the shelving unit, identify, based on the image of the shelving unit, boundaries of the at least one or the items located in the shelving unit, and generate, based on the image of the shelving unit and the action item for the at least one of the items located in the shelving unit, an action image, wherein the action image includes an action indicator based on the action item for the at least one of the items located in the shelving unit, wherein the action indicator is located within the boundaries of the at least one of the items located in the shelving unit, and a display device, wherein the display device is communicatively coupled to the control circuit, and wherein the display device is configured to present the action image on the shelving unit, wherein during presentation of the action image, the action indicator is presented on the at least one of the items located in the shelving unit.

In some embodiments, an apparatus and a corresponding method performed by the apparatus comprises capturing, by an image capture device, an image of a shelving unit, identifying, by a control circuit based on the image of the shelving unit, items located in the shelving unit, determining, by the control circuit based on an identity of at least one of the items located in the shelving unit, an action item for the at least one of the items located in the shelving unit, identifying, based on the image of the shelving unit, boundaries of the at least one of the items located in the shelving unit, generating, based on the image of the shelving unit and the action item for the at least one of the items located in the shelving unit, an action image, wherein the action image includes an action indicator based on the action item for the at least one of the items located in the shelving unit, wherein the action indicator is located within the boundaries of the at least one of the items located in the shelving unit, and presenting, by a display device, the action image on the shelving unit, wherein during presentation of the action image, the action indicator is present on the at least one of the items located in the shelving unit.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for displaying action indicators on items in a retail facility, the system comprising:
   an image capture device, wherein the image capture device is configured to capture an image of a product storage unit;
   a control circuit, wherein the control circuit is communicatively coupled to the image capture device, and wherein the control circuit is configured to:
      identify, based on the image of the product storage unit, items located in the product storage unit;
      determine, based on an identity of at least one of the items located in the product storage unit, an action item for the at least one of the items located in the product storage unit;
      generate, based on the image of the product storage unit and the action item for the at least one of the items located in the product storage unit, an action image, wherein the action image includes an action indicator based on the action item for the at least one of the items located in the product storage unit; and
      output signaling to cause the action image to be displayed to a user.

2. The system of claim 1, wherein the product storage unit includes at least one bin.

3. The system of claim 1, further comprising a point-of-sale (POS) system, wherein the control circuit is communicatively coupled to the POS system, and wherein the POS system is configured to:
   provide, to the control circuit, sales data.

4. The system of claim 1, wherein the action item includes one or more of a restock action, a recall action, an expiration action, a do nothing action, a pick action, a modular action, and a priority action.

5. The system of claim 1, further comprising an activity sensor, wherein the activity sensor is configured to:
   detect activity; and
   in response to the detection of activity, transmit a detection signal to the control circuit, wherein the detection signal triggers outputting of the signaling to cause the action image to be displayed to the user.

6. The system of claim 5, wherein the activity sensor is one or more of a motion sensor, a proximity sensor, a light sensor, an auditory sensor, and a radio frequency identification (RFID) reader.

7. The system of claim 5, wherein the detection signal includes an indication of a person detected by the activity sensor, and wherein the control circuit is further configured to:
- determine, based on the indication of the person detected by the activity sensor, an identity of the person, wherein inclusion of the action indicator is based on the identity of the person.

8. The system of claim 5, wherein the control circuit is further configured to:
- generate, in response to receipt of the detection signal, an updated action image.

9. The system of claim 1, wherein at least one of the image capture device, the control circuit, and the display device is located in a stockroom of the retail facility.

10. The system of claim 1, further comprising a display device associated with the image capture device, wherein the display device is communicatively coupled to the control circuit, and wherein the display device is configured to display the action image.

11. A method for displaying action indicators on items in a retail facility, the method comprising:
- capturing, by an image capture device, an image of a product storage unit;
- identifying, by a control circuit based on the image of the product storage unit, items located in the product storage unit;
- determining, by the control circuit based on an identity of at least one of the items located in the product storage unit, an action item for the at least one of the items located in the product storage unit;
- generating, based on the image of the product storage unit and the action item for the at least one of the items located in the product storage unit, an action image, wherein the action image includes an action indicator based on the action item for the at least one of the items located in the product storage unit; and
- outputting, by the control circuit, signaling to cause the action image to be displayed to a user.

12. The method of claim 11, wherein the product storage unit includes at least one bin.

13. The method of claim 11, further comprising:
- receiving, by the control circuit from a point-of-sale (POS) system, sales data.

14. The method of claim 11, wherein the action item includes one or more of a restock action, a recall action, an expiration action, a do nothing action, a pick action, a modular action, and a priority action.

15. The method of claim 11, further comprising:
- detecting, by an activity sensor, activity; and
- in response to detecting the activity, transmitting a detection signal to the control circuit, wherein the signal triggers outputting of the signaling to cause the action image to be displayed to the user.

16. The method of claim 15, wherein the activity sensor is one or more of a motion sensor, a proximity sensor, a light sensor, an auditory sensor, and a radio frequency identification (RFID) reader.

17. The method of claim 15, wherein the detection signal includes an indication of a person detected by the activity sensor, further comprising:
- determining, based on the indication of the person detected by the activity sensor, an identity of the person, wherein inclusion of the action indicator is based on the identity of the person.

18. The method of claim 15, further comprising:
- generating, in response to receipt of the detection signal, an updated action image.

19. The method of claim 11, wherein at least one of the image capture device, the control circuit, and the display device is located in a stockroom of the retail facility.

20. The method of claim 11, further comprising a display device associated with the image capture device, wherein the display device is communicatively coupled to the control circuit, and wherein the display device is configured to display the action image.

* * * * *